United States Patent
Shpilyuck et al.

(10) Patent No.: US 12,346,222 B2
(45) Date of Patent: Jul. 1, 2025

(54) SYSTEM AND METHOD FOR BACKING UP DATA FROM EDGE INFRASTRUCTURES

(71) Applicant: Dell Products L.P., Round Rock, TX (US)

(72) Inventors: Boris Shpilyuck, Ashdod (IL); Maxim Balin, Gan-Yavne (IL); Igor Dubrovsky, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 18/495,160

(22) Filed: Oct. 26, 2023

(65) Prior Publication Data

US 2025/0138955 A1 May 1, 2025

(51) Int. Cl.
*G06F 11/14* (2006.01)
*G06F 21/62* (2013.01)

(52) U.S. Cl.
CPC ...... *G06F 11/1464* (2013.01); *G06F 11/1456* (2013.01); *G06F 11/1461* (2013.01); *G06F 21/6218* (2013.01)

(58) Field of Classification Search
CPC ............. G06F 11/1464; G06F 11/1456; G06F 11/1461; G06F 21/6218
See application file for complete search history.

(56) References Cited

U.S. PATENT DOCUMENTS

| | | | | |
|---|---|---|---|---|
| 9,026,751 | B2 * | 5/2015 | Irisawa | G06F 3/0631 711/162 |
| 2008/0320219 | A1 * | 12/2008 | Okada | G06F 11/2064 711/E12.001 |
| 2010/0274767 | A1 * | 10/2010 | Irisawa | G06F 11/1456 707/654 |
| 2019/0369699 | A1 * | 12/2019 | Pathak | G06F 1/3206 |
| 2021/0173747 | A1 * | 6/2021 | Li | G06F 11/1458 |
| 2021/0390021 | A1 * | 12/2021 | Baughman | H04W 64/003 |
| 2024/0020207 | A1 * | 1/2024 | Malamut | G06F 3/067 |

* cited by examiner

*Primary Examiner* — Kamini B Patel
(74) *Attorney, Agent, or Firm* — WOMBLE BOND DICKINSON (US) LLP (57) ABSTRACT

Methods and systems for managing a backup system are disclosed. Edge infrastructures may be made up of large numbers of edge devices that produce and store a wide variety of data. A data backup system is implemented to locate and monitor locations of data stored in these edge infrastructures such that users wanting to backup data from these edge infrastructures are not required to know an exact location and/or an exact name of the data to be backed up. In particular, the data backup system could backup data using only natural language descriptions of the data that is provided by the user.

20 Claims, 6 Drawing Sheets

SYSTEM AND METHOD FOR BACKING UP DATA FROM EDGE INFRASTRUCTURES

FIELD

Embodiments disclosed herein relate generally to data storage and data backup. More particularly, embodiments disclosed herein relate to systems and methods for managing data backup from edge infrastructures.

BACKGROUND

Computing devices may store data and used stored data. For example, computing devices may utilize data when providing computer implemented services. Different computing devices may perform similar and/or different functions. The components of computing devices may generate data that may be relevant to future operations. The data may be used during the future operations.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data backup in edge infrastructures. Edge infrastructures (e.g., an edge environment) can be made up of many types of edge devices (e.g., edge computing devices such as internet-of-things (IoT) sensors, smart cameras, universal Customer Premises Equipment (uCPEs), servers, processors, etc.) that produce and store a wide variety of data. As a result, data diversity is extensive, with varying levels of criticality.

To effectively implement backups of data stored in such edge infrastructures, it becomes essential to identify specific pieces of data (e.g., files, disks, physical, virtual machines (VMs), etc.) to safeguard using exact information of the pieces of data (e.g., the exact name (e.g., filename, application name, extension, etc.), the exact physical location of (e.g., path/pathway to) the pieces of data within edge infrastructure, etc.). However, this task can be highly intricate and difficult to implement due to the sheer volume of data stored within the edge infrastructure, especially for a user (e.g., a businessperson without information technology (IT) training) who is not well-versed in (or does not have direct authoritative/administrative access (e.g., privilege) to one or more of) the edge devices that make up the edge infrastructures.

For example, a user with no knowledge of the structure of the edge infrastructure may not know the exact storage location of a specific piece of data (e.g., a demarcation of storage resources in which the specific piece of data is stored) within the edge devices of an edge infrastructure and therefore would not be able to identify this specific piece of data for backup. As yet another example, the user may not even know the exact data (or types of data) stored in the edge infrastructure but still wishes to backup certain data that is relevant for the user (e.g., for the user's business, for the user to use the data to receive or provide computer-implemented services, for the user to implement safeguard policies for the data, etc.).

To provide improved accessibility for backing up data stored in such edge infrastructures (e.g., for users with little to no knowledge or information of the data stored in the edge infrastructures and/or of the structure of the edge infrastructure itself, for users without direct authoritative/administrative access (e.g., privilege) to access the edge devices of the edge infrastructures, etc.), a data backup process for managing a data backup system of one or more embodiments may be implemented. In particular, rather than having a user provide the exact name and/or location of a piece of data stored within an edge infrastructure, embodiments disclosed herein allow users to instead provide a natural language (e.g., prose) description of the piece of data to be backed up (or retrieved). The natural language description may include a description of (e.g., may define): information content associated with the piece of data (e.g., contents of a document, file, etc.), software components that use data from the piece of data, and other relevant description of the piece of data without actually having to contain the exact name and location of the piece of data.

Such natural language description may be provided to a lookup manager of a data backup system associated with the edge infrastructure(s) that uses the description information included in the natural language description to identify (e.g., locate) one or more pieces of data stored within the edge infrastructure(s) that is an exact or close match of the description information. The lookup manager can then provide the location of the located pieces of data to a backup manager that will then backup the located pieces of data.

Additionally, pieces of data identified as backup targets may be monitored by the lookup manager (e.g., within a data retention period specified in a data retention policy) such that the lookup manager is always aware of the location of the backup targets. In particular, when a backup target is moved from one location (e.g., a first edge device) to another location (e.g., a second edge device) (or even to a different data structure within the same first edge device), the lookup manager will be aware of such move and provide the new location (e.g., an updated location) of the backup target to the backup manager for back up purposes.

Even further, once backup targets are located using description information contained within a natural language description, the lookup manager can associate the backup targets with such description information (e.g., using the description information as key to perform a lookup in a data structure that associates different description information with different backup targets). This advantageously allows backup targets for subsequently received natural language descriptions having identical or similar description information can be quickly located (e.g., by the lookup manager).

By doing so, an improved data backup system within an edge infrastructure (or within edge infrastructures) may be obtained. The improved device and/or system may provide an efficient and automated solution for backing up data stored in edge infrastructures. In particular, not only does the backing up of data become easier and more efficient for users (e.g., especially for users with little to no knowledge about the edge infrastructures and the data stored within), but the backup process itself also made more efficient, which saves computing resources of the computing devices making up the data backup system and the edge infrastructures; effectively improving the performances (e.g., computing functionalities) of these computing devices.

In an embodiment, a computer implemented method for managing a data backup system is provided. The method may include: obtaining, by a lookup manager of the data backup system, a backup request, the backup request comprises a natural language description of at least one backup target; locating, by the lookup manager and within one or more edge devices of an edge infrastructure, a piece of data implicated by the natural language description as the at least one backup target; providing, by the lookup manager to a backup manager of the data backup system, backup target information of the at least one backup target based on the locating of the piece of data, the backup target information comprising a location of the piece of data within the edge devices of the edge infrastructure; generating, by the backup manager, a backup policy based, at least in part, on the backup target information; and performing, by the backup manager and based on the backup policy, a backing up of the at least one backup target from the edge infrastructure to a target backup location.

The natural language description excludes information specifying the location of the at least one backup target within the edge infrastructure, and wherein the backup request specifies the target backup location.

The location of the piece of data is unknown to a user at a point in which at which the backup request is obtained by the lookup manager and from a client device of the user, and the lookup manager provides the location of the piece of data to the backup manager without also providing the location of the piece of data to the user.

The backup request indicates a backup schedule for the at least one backup target and a retention policy of the at least one backup target, the backup schedule and the retention period are provided to the backup manager by the lookup manager, and the backup policy is further generated based on the backup schedule and the retention period.

Access to the at least one backup target is restricted by privilege, and the user lacks privilege to access the at least one backup target.

The backup request indicates a backup schedule for the at least one backup target and a retention policy of the at least one backup target, and the method could further include: monitoring, by the lookup manager and within the backup schedule, the piece of data within the edge infrastructure; making a first determination, by the lookup manager and during the monitoring, that the piece of data is moved from a first edge device of the edge devices to a second edge device of the edge devices; in response to the first determination, providing, by the lookup manager, updated backup target information to the backup manager, the updated backup target information including an updated location of the piece of data; and updating, by the backup manager, the backup policy with the updated location of the piece of data to obtain an updated backup policy.

The method could further include: making a second determination, by the backup manager and based on the backup schedule, that a subsequent backup of the piece of data is due, the subsequent backup occurring after the piece of data is moved from the first edge device to the second edge device; and performing, by the backup manager and in response to the second determination, the subsequent backup of the piece of data using the updated backup policy that specifies the updated location of the piece of data.

The lookup manager monitors the piece of data at a predetermined interval until a backup period indicated in the backup schedule expires.

The natural language description defines information content of the at least one backup target, and the information content is used as key to perform a lookup in a data structure that associates different information content with different backup targets.

The natural language description defines software components that use data from the at least one backup target in operation of the software components, and the software components are used as keys to perform a lookup in a data structure that associates different software components with different backup targets.

The natural language description does not exactly match any identifier ascribed to: the at least one backup target, and any demarcation of storage resources in which the at least one backup target is stored.

Figure 1:
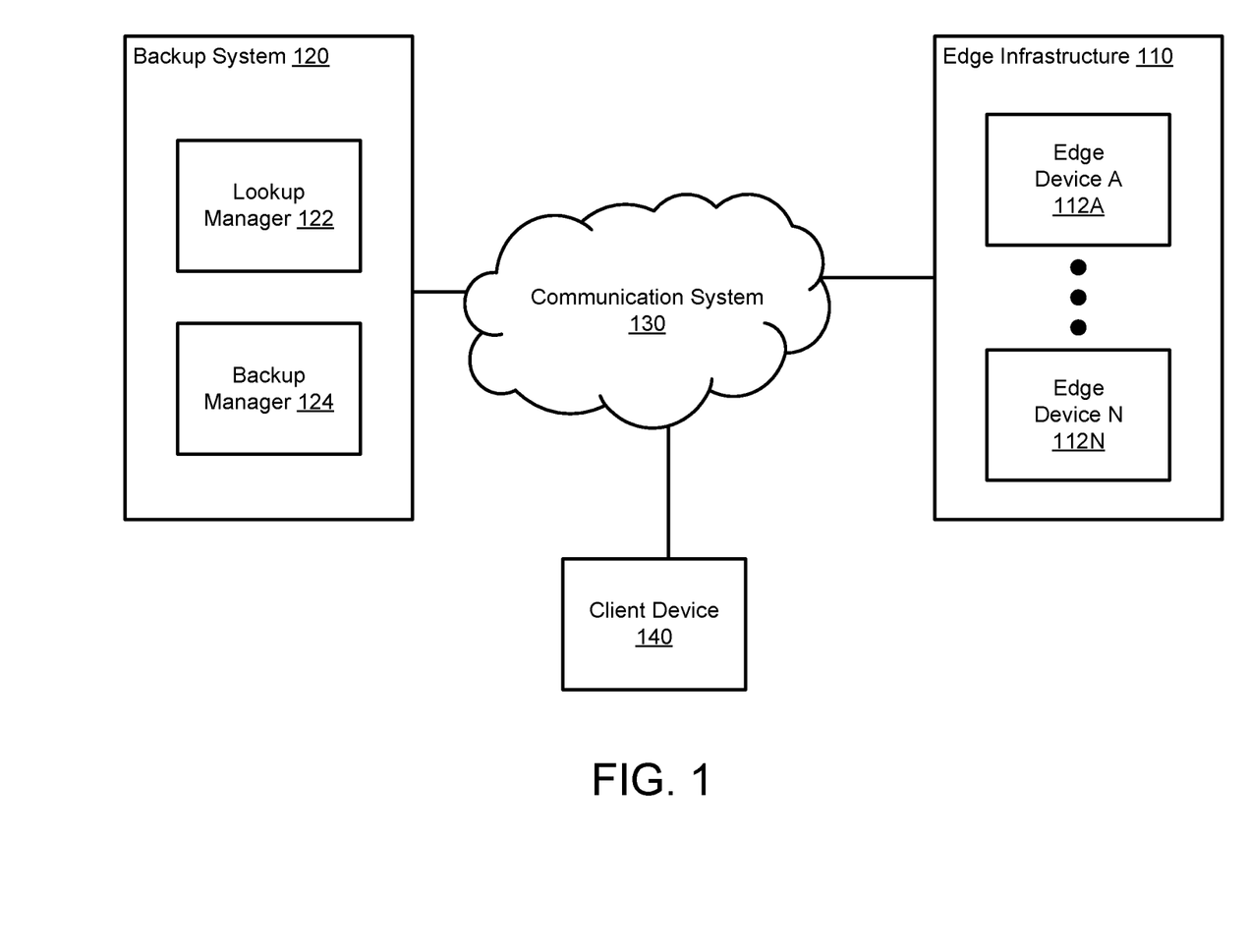
FIG. 1 shows a block diagram illustrating a distributed system in accordance with an embodiment.

Turning to FIG. 1, a block diagram illustrating a distributed system in accordance with an embodiment is shown. The system shown in FIG. 1 may provide computer implemented services. The system may include devices and/or systems such as edge infrastructure 110, backup system 120, and client device 140. Any number of these devices and/or systems may provide the computer-implemented services independently and/or cooperatively.

For example, edge infrastructure 110 may include (e.g., can be made up of) one or more edge devices 112A-112N. Each of the edge devices 112A-112N can be implemented using an edge computing device such as, but not limited to: an internet-of-things (IoT) sensor, a smart camera, a universal Customer Premises Equipment (uCPE), a server, a processors, etc. Each of the edge devices 112A-112N can also be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Each of the edge devices 112A-112N may provide computer-implemented services to users and/or other computing devices operably connected to the distributed system of FIG. 1. The computer-implemented services may include any type and quantity of services including, for example, database services including data storage and data backup services, instant messaging services, video conferencing services, etc. Different systems may provide similar and/or different computer-implemented services.

To provide the computer-implemented services, each edge device 112A-112N may host applications that provide these (and/or other) computer-implemented services. For example, in order to provide all or a portion of the computer-implemented services, one or more edge devices 112A-112N may obtain and/or provide data (e.g., to other systems and/or devices of the distributed system of FIG. 1) via operable connections to communication system 130.

In particular, any of the components illustrated in FIG. 1 may be operably connected to each other (and/or components not illustrated) with a communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

When providing its functionality (or functionalities), the edge infrastructure 110 may perform (e.g., through the individual or combined operations of the edge devices 112A-112N), all, or a portion, of the method and/or actions discussed below in reference to FIGS. 2A-2B and 3A-3B.

The distributed system of FIG. 1 may further include a backup system 120 (e.g., a data backup system) hosting a lookup manager 122 and a backup manager 124. The backup system 120 can be implemented using a computing device such as a host or server, a personal computer (e.g., desktops, laptops, and tablets), a "thin" client, a personal digital assistant (PDA), a Web enabled appliance, an embedded system, local controllers, and/or any other type of data processing device or system. For additional details regarding computing devices, refer to FIG. 4. In some embodiments, the backup system 120 may be hosted within (e.g., may be a part of) the edge infrastructure 110 (e.g., within a same building such as a data center).

In some embodiments, each of the lookup manager 122 and backup manager 124 may be implemented using separate and distinct ones of be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

The backup system 120 as a whole (or each of the lookup manager 122 and backup manager 124) may provide computer-implemented services to users and/or other computing devices operably connected to the distributed system of FIG. 1. The computer-implemented services may include any type and quantity of services including, for example, database services including data storage and data backup services, etc. To provide the computer-implemented services, each backup system 120 may host applications (e.g., lookup manager 122 and backup manager 124) that provide these (and/or other) computer-implemented services. Alternatively, as separate and individual computing devices, each of the lookup manager 122 and backup manager 124 may also host applications that provide these (and/or other) computer-implemented services.

When providing its functionality (or functionalities), the backup system 120 may perform (e.g., through the operations of the backup manager 124 and the lookup manager 122) all, or a portion, of the method and/or actions discussed below in reference to FIGS. 2A-2B and 3A-3B.

The distributed system of FIG. 1 may further include a client device 140. The client device 140 can be implemented using a computing device such as a host or server, a personal computer (e.g., desktops, laptops, and tablets), a "thin" client, a personal digital assistant (PDA), a Web enabled appliance, an embedded system, local controllers, and/or any other type of data processing device or system. For additional details regarding computing devices, refer to FIG. 4. In some embodiments, the client device 140 may be a target backup location for data to be backed up from the edge infrastructure 110. Alternatively, the target backup location may be any other device and/or system within the distributed system of FIG. 1 (including additional computing devices not shown in FIG. 1 that could also be attached to the communication system).

The client device 140 may receive the computer-implemented services (e.g., the data storage and data backup services) provided by the edge infrastructure 110 and the backup system 120. Additionally, when providing its functionality (or functionalities), the client device 140 may perform all, or a portion, of the method and/or actions discussed below in reference to FIGS. 2A-2B and 3A-3B.

While illustrated in FIG. 1 as included a limited number of specific components, a system in accordance with an embodiment may include fewer, additional (e.g., additional ones of the client device 140, additional computing devices (not shown) connected to communication system 130, etc.), and/or different components than those illustrated therein.

Figure 2A:
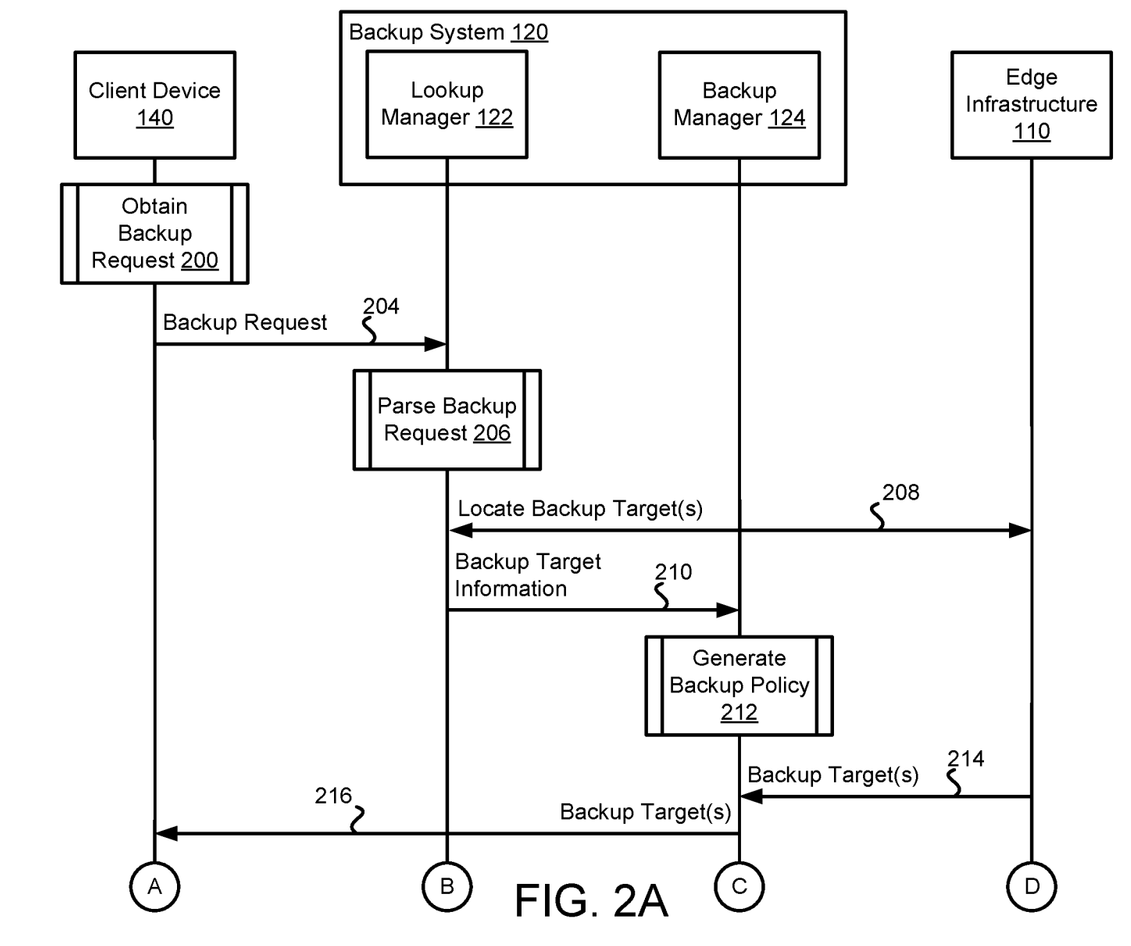
FIGS. 2A-2B show data flow diagrams illustrating a data backup process for a data backup system in accordance with an embodiment.
Figure 2B:
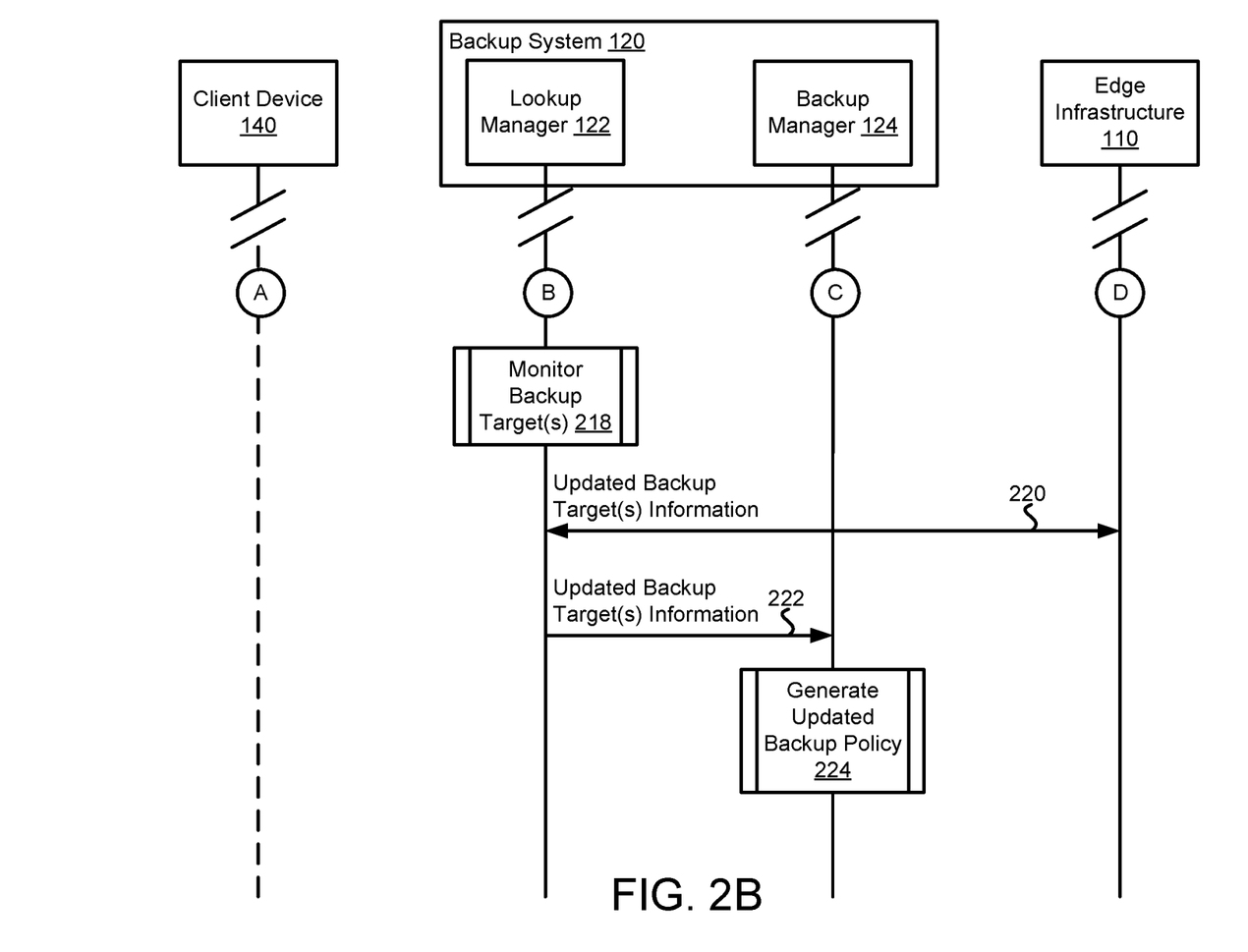

Turning to FIGS. 2A-2B, a data flow diagram in accordance with an embodiment is shown. The data flow diagram may illustrate an automated data backup process to be performed within a distributed system similar to that of FIG. 1. As discussed in FIG. 1, edge infrastructure 110, backup system 120 including lookup manager 122 and backup manager 124, and client device 140 may be connected to one another via communication system 130, allowing the systems and/or devices to communicate and exchange information with one another.

At operation 200, the client device 140 obtains a backup request. The backup request may be obtained from a user of the client device 140 (e.g., input into the client device 140 using peripherals (e.g., a mouse, keyboard, touchscreen, etc.) of the client device 140. In some embodiments, the client device 140 may also obtain the backup request from another computing device (as described above in reference to FIG. 1) connected to the communication system 130 of the distributed system of FIG. 1.

The backup request may include a natural language description of one or more backup targets. The one or more backup targets can be one or more pieces of data stored within edge devices 112A-112N of edge infrastructure 110. The one or more pieces of data can be any of, but is not limited to: a program (e.g., an application program interface (API), software application, component and/or code, etc.), a document, a group of documents, a folder, a sub-folder, a group of folders and/or sub-folders, one or more virtual machines (VMs), an entire storage (e.g., an entire hard drive), multiple storages, one or more demarcations within a storage, etc. In particular, each of the one or more pieces of data can be of any size and contain any groupings of data without departing from the scope of embodiments disclosed herein.

The natural language description excludes information specifying the location (e.g., a physical location, a path (e.g., data path to a directory or file), any demarcation of (e.g., divided portions within) one or more storage resources, etc.) of the at least one backup target within the edge infrastructure. Said another way, the natural language description does not specify (e.g., indicate) which edge device(s) (specifically, an exact location within one or more storage resources of the edge device(s)) within the edge infrastructure the backup target(s) are stored. This is because the location of the piece of data (to become the backup target) is unknown to the user at a point in which at which the backup request is submitted (e.g., input) by the user to the client device 140.

In one example, the user may not know the location of the backup target within the edge infrastructure because the user is not aware of the exact data being stored and/or managed in the edge infrastructure. In another example, the user may not know the location of the backup target because access to the backup target(s) (e.g., a directory, storage resource, etc. storing the backup target) is restricted by privilege, and the user lacks privilege to access the backup target(s). Thus, even though the user is aware that the backup target(s) is stored somewhere in the edge infrastructure, the user does not have the privilege/authority to go through the edge infrastructure to locate the backup target.

In some embodiments, the natural language description does not exactly match any identifier (e.g., tags, indexes, flags, etc.) ascribed to the backup target(s). For example, the backup target may be a single file named "Spring_2023_Performance_Review.docx" while the natural language description may include a statement such as "Back up all performance reviews for spring and summer 2023" without including the exact file name of this specific backup target. Additionally, the natural language description does not exactly match any identifier ascribed to any demarcation of storage resources in which a backup target is stored. For example, the demarcation of storage resources of a backup target may be "storage A1 of edge device C" while the natural language description may include a statement such as "Back up all performance reviews for spring and summer 2023" that does not include "storage A1 of edge device C."

In some embodiments, the natural language description may include a description of the backup target(s). The description of the backup target may indicate any of, for example: a file type, information content of the backup target (e.g., a description of the backup target(s)' contents), software components (e.g., APIs, software applications, software code, etc.) that use data from the backup target(s), one or more user designations of the backup target (e.g., a severity level, privilege level, confidentiality level, an owner, etc.). For example, the natural language description may include a statement such as "Back up all data with a severity level marked as critical." In some embodiments, the natural language description may also include any logical and/or business terms. The description information indicated by the natural language could be aligned to syntax of one or more frameworks such as, but not limited to: JEP expressions, Drools, Rego open policy agent (OPA), and any other similar framework types.

The backup request may also include: (i) a target backup location (e.g., client device 140 or any other computing device(s) connected to communication system 130); (ii) a backup schedule for the backup target(s); and (iii) a retention policy of the backup target(s).

The backup schedule may indicate, for example: (i) a backup period for performing one or more backups of the backup target(s); (ii) a number of backups to be performed within the backup period; (iii) when (e.g., a timing of when, a window encompassing when, etc.) each backup to be performed within the backup period should be started and/or completed; etc. The retention policy may indicate, for example: (i) how long the backup target should be retained within the target backup location; (ii) one or more formats the backup target(s) should be retained in; (iii) triggers for deleting the backup target(s) from the backup target location; (iv) level of privilege or authority required to delete the backup target(s) from the backup target location; etc.

Other parameters and/or information related to backing up and retaining data may be indicated by the backup schedule and the retention policy without departing from the scope of embodiments disclosed herein.

At operation 204, the client device 140 may transmit backup request to the lookup manager 122 of the backup system 120. The backup request may be transmitted over the communication system 130 using any type of communication protocol that is available between the client device 140 and backup system 120. In some embodiments, the backup request can also be encrypted by the client device 140 before it is then transmitted to and decrypted by the backup system 120. Any form of encryption/decryption method and/or protocol may be used without departing from the scope of embodiments disclosed herein.

At operation 206, the lookup manager 122 of the backup system 120 obtains (e.g., receives) the backup request and parses the backup request. After parsing the backup manager 124, the lookup manager 122 could obtain the natural language description, the backup schedule, and the retention policy.

The lookup manager 122 may additionally (e.g., further) parse the natural language description indicated within the backup request using any type of natural language processing (NLP) process. The lookup manager 122 may also parse the natural language description indicated within the backup request using any type of framework (or combination of frameworks) such as, but not limited to: JEP expressions, Drools, Rego open policy agent (OPA), and any other similar framework types. Such parsing of the natural language description by the lookup manager 122 could be implemented for the lookup manager 122 to determine one or more pieces of data (stored within the edge infrastructure 110) as backup targets for the backup request.

The lookup manager 122 could also be implemented to host one or more inference engines (e.g., rules-based inference engines, Bayesian inference engines, fuzzy logic inference engines, neural network inference engines, genetic algorithm inference engines, decision tree inference engines, etc.) that generate inferences using one or more trained inference models. The inference engines may be trained using a combination of: (i) information of the data stored in the edge infrastructure; (ii) training and/or test data compiled by an administrator of the data system to simulate and test different combinations of possible natural language descriptions that could be received by the lookup manager 122; (iii) results of past and/or ongoing backup requests; (iv) the above-discussed frameworks, (v) the above-discussed NLP processes, etc. For example, the inference engine(s) of the lookup manager 122 may intake (and parse) the natural language description and generate one or more inferences that indicate one or more pieces of data stored in the edge infrastructure 110 (e.g., possible/potential pieces of data indicative of the backup target(s) indicated by the natural language description). For example, the inference engine(s) may determine that files such as "Spring_2023_Performance_Review.docx" and "Summer_2023_Performance_Review.docx" are the pieces of data stored in the edge infrastructure to become the backup targets for a natural language description including the statement "Back up all performance reviews for the year 2023."

At operation 208, once the pieces of data that are to become the backup targets for the backup request are identified by the lookup manager 122, the lookup manager 122 searches (e.g., parses) the edge infrastructure 110 to locate these pieces of data implicated by the natural language description. Alternatively or in addition to the above, the lookup manager 122 could implement the inference generation as it actively searches through the storage resources of the edge infrastructure 110 to find (other) possible/potential pieces of target to become the backup target for the backup.

As the training of the one or more inference engines progresses, the one or more inference engines of the lookup manager 122 could more accurately identify pieces of data to become backup targets for the backup requests. Such information from the lookup manager 122 may be used to enhance a user interface (UI) (e.g., on the client device 140) that the user uses to input the backup request. As a result of the enhancement, the UI may be able to guide the user in entering a natural language description that could potentially cover (with a high degree of accuracy such as 90% (or any other standard set by an administrator of the backup system or the user) or higher) all of the pieces of data (stored in the edge infrastructure 110) that the user wishes to back up. For example, the UI may be enhanced to include functions such as, but not limited to: (i) validation; (ii) error correction; (iii) auto completion; or the like as the user enters the natural language description into the UI.

Alternatively, such enhanced functions of the UI may be performed by the lookup manager 122 upon receiving and parsing the backup request. For example, after parsing the natural description language, the lookup manager 122 may determine that a better description or an error in the description exists. The lookup manager 122 could then transmit such results to the client device 140 to the presented to the user (e.g., presented as a question/statement such as "Did you mean to back up all performance reviews for the year 2023 instead of 2323?" or "Recommendation: resubmit a backup request using natural language description X to get more accurate results. Cancel current backup request?").

To further enhance an accuracy (and a speed) for locating the pieces of data, the lookup manager 122 may perform periodical (e.g., based on a user-set interval of any duration) indexing (e.g., within one or more data structures created within the lookup manager 122) of all of the data stored in the edge infrastructure. Such indexing may also be performed why the lookup manager 122 in performing the lookup (e.g., locating) of the pieces of data to become the backup targets of the backup request. The data structures may be implemented in any size or format (e.g., a list, a table, key-value pairs, etc.). Additionally, the lookup manager 122 may could also create one or more data structures that associate the different description information discussed above (e.g., the information content, the software components that use data from the backup target, etc.) with one or more pieces of data stored in the edge infrastructure. For example, the description information would be a key used to perform a lookup in such data structures. As a result, the lookup manager 122 would be able to determine and locate the pieces of data as backup targets more quickly and efficiently. This also directly results fewer computing resources needing to be expended (e.g., consumed) for each subsequent determination of pieces of data as backup targets which improves the computing functionalities of the lookup manager 122 (and an entirety of the backup system 120).

At operation 210, after locating the piece(s) of data to become the backup target(s) for the backup request, the lookup manager 122 provides (e.g., transmits) backup target information to the backup manager 124. The backup target information could include: (i) the (exact) location of the piece(s) of data within the edge infrastructure; (ii) the backup schedule indicated in the backup request; (iii) the retention policy indicated in the backup request; (iv) the target backup location indicated in the backup request; or the like. At this time, the lookup manager 122 provides the location of the piece(s) of data to the backup manager 124 without also providing the location of the piece(s) of data to the user.

At operation 212, the backup manager 124 generates a backup policy using the backup target information provided by the lookup manager 122. The backup policy could be a set of rules and procedures (generated based on the backup target information) that describe a strategy for making backup copies of the backup target(s) for safekeeping (e.g., in the target backup location). The backup policy could be generated by the backup manager 124 using any process (e.g., using generative artificial intelligence (GAI), using any of the above-described inference engines, using one or more rules-based engines, using one or more trained machine learning models, or the like).

At operation 214, the backup manager 124 executes the generated backup policy to perform the backing up of the piece(s) of data identified as the backup target(s). Upon performing the backing up of the backup target(s), the backup manager 124 retrieves the backup target(s) from the edge infrastructure 110 using the location of the piece(s) of data within the edge infrastructure indicated in the backup target information that was used as a basis for generating the backup policy. Retrieving the backup target(s) could entail generating backup copies of the backup target(s).

At operation 216, the backup manager 124 transmits the generated backup copies of the backup target(s) to the client device 140 (e.g., the target backup location in this example of embodiments disclosed herein) for storage by the client device 140. Said another way, the backup manager 124 performs a backing up of the backup target(s) from the edge infrastructure 110 to the target backup location.

Turning now to FIG. 2B, after (or concurrently as) the backup manager 124 is performing the backup of the backup target(s) based on the backup policy, the lookup manager 122 continuously monitors the backup target(s) within the edge infrastructure 110 at operation 218. Such continuous monitoring of the backup target(s) within the edge infrastructure 110 could be done at intervals (e.g., a predetermined time interval of any amount of time) set by an administrator of the backup system 120. Such continuous monitoring of the backup target(s) within the edge infrastructure 110 could also continue until a backup period indicated in the backup schedule expires.

At operation 220, while monitoring the backup target(s) within the edge infrastructure 110, the lookup manager 122 determines that the location of at least one of the backup target(s) has changed. For example, the lookup manager 122 determines that a backup target stored in a first edge device 112A of the edge infrastructure 110 has been moved to be stored a different location (e.g., a second edge device 112N of the edge infrastructure, a different demarcation of storage resources within the first edge device 112A, or the like). In response to determining that the location of the backup target has changed, the lookup manager 122 obtains an updated location of the backup target within the edge infrastructure 110. The lookup manager 122 then updates the original backup target information (e.g., the backup target information generated in operation 210 of FIG. 2A) using the updated location of the backup target to obtain updated backup target information.

At operation 222, the lookup manager 122 provides the updated backup target information to the backup manager 124 to ensure that the backup manager 124 is also aware that the location of the backup target has changed.

At operation 224, the backup manager 124 uses the updated backup target information provided from the lookup manager to update the originally generated backup policy (e.g., the backup policy generated in operation 212 of FIG. 2A) to obtain an updated backup policy that includes the updated location of the backup target. As a result, when subsequent backup of the backup target/piece of data is due based on the backup schedule, the backup manager 124 will use the updated backup policy such that the backup manager 124 does not perform an incomplete backing up of the backup target(s) (e.g., the backup target that was moved to a different location gets missed during the backup because the original backup policy is no longer accurate). This advantageously allows the backup system 120 to always be aware of where any of the pieces of data stored in the edge infrastructure 110 is located such that the user does not have to know/have this information to complete a backup of the user's desired data.

Thus, as illustrated in FIGS. 2A-2B, the system of FIG. 1 may provide an improved and efficient method for managing a data backup system to complete an automated backing up of data stored in one or more edge infrastructures.

Figure 3A:
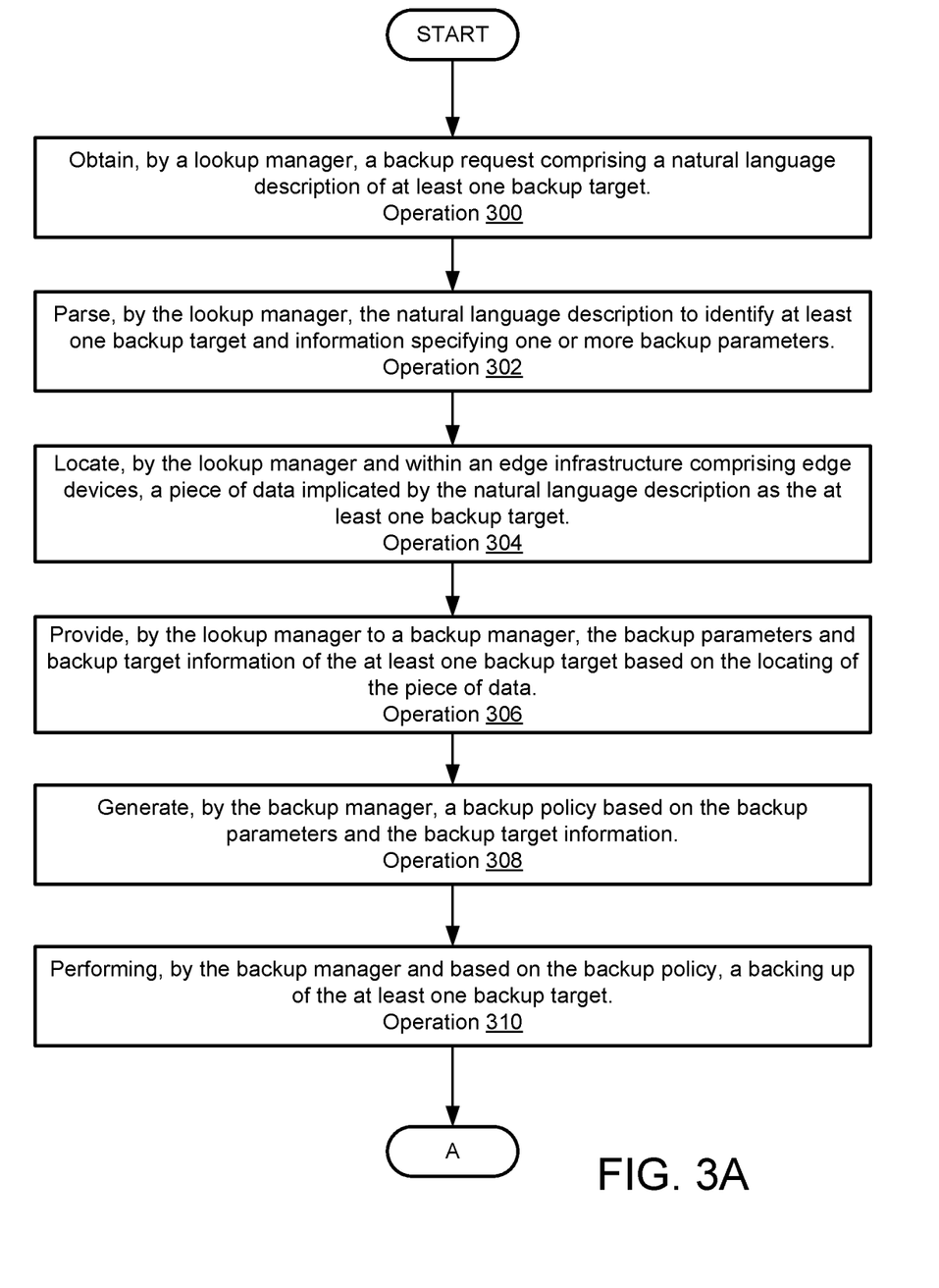
FIGS. 3A-3B show a flow diagram illustrating a method of managing remote network provisioning of a data processing system in accordance with an embodiment.
Figure 3B:
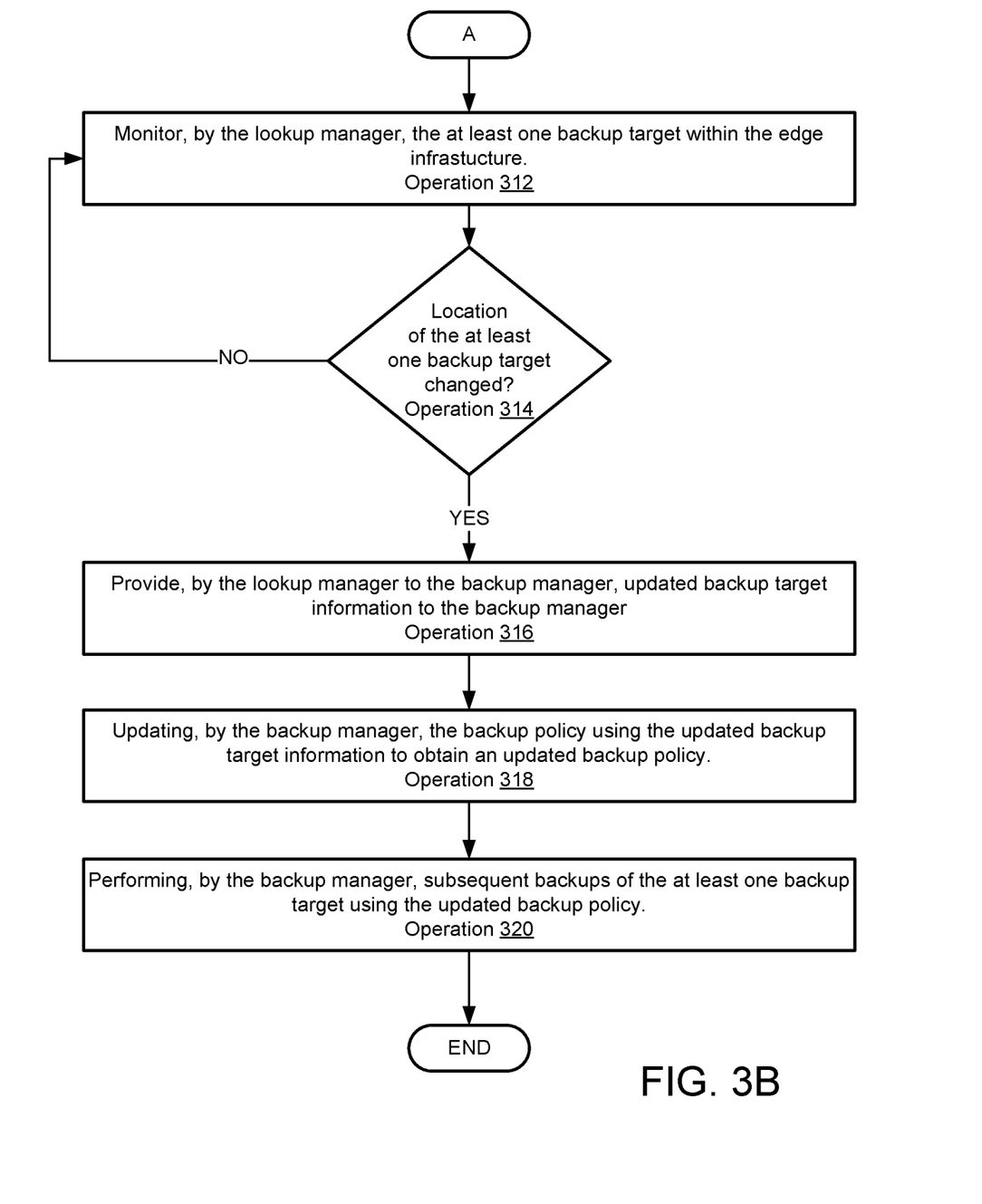

Turning to FIGS. 3A-3B, a flow diagram illustrating a method of managing a data backup system in accordance with an embodiment is shown. The method may be performed by any of the devices of the backup system 120 such as the lookup manager 122 and backup manager 124, and/or any other components of the system shown in FIG. 1. Any operations described with respect to FIGS. 3A-3B may be performed in different, skipped, repeated, and/or be performed in a parallel or partially overlapping in time manner.

At operation 300, as discussed above in reference to FIGS. 2A-2B, a backup request comprising a natural language description of at least one backup target is obtained by a lookup manager of a backup system. The backup target could be stored in one or more edge infrastructures (namely, edge devices making up the edge infrastructures). The natural language description is provided by a user that does not know a location of the at least one backup target within the edge infrastructures.

At operation 302, as discussed above in reference to FIGS. 2A-2B, the natural language description is parsed by the lookup manager to identify at least one backup target and information specifying one or more backup parameters. The information specifying one or more backup parameters could include a backup schedule for a backup and a retention policy for the backup.

At operation 304, as discussed above in reference to FIGS. 2A-2B, a piece of data (stored in the edge infrastructures) implicated by the natural language description is located by the lookup manager as the at least one backup target.

At operation 306, as discussed above in reference to FIGS. 2A-2B, once the at least one backup target is located by the lookup manager, the backup parameters and backup target information of the at least one backup target is provided by the lookup manager to the backup manager.

At operation 308, as discussed above in reference to FIGS. 2A-2B, a backup policy is generated by the backup manager based on the backup parameters and the backup target information. At operation 310, a backing up of the at least one backup is performed by the backup manager using the generated backup policy.

Turning now to FIG. 3B, as discussed above in reference to FIGS. 2A-2B, after (or in parallel to) the generation of the backup policy by the backup manager in operation 310 of FIG. 3A, the lookup manager monitors the piece of data (e.g., the at least one backup target) within the edge infrastructure.

At operation 314, as discussed above in reference to FIGS. 2A-2B, the lookup manager makes a determination to determine whether the location of the at least one backup target within the edge infrastructure has changed.

In the event that the determination in operation 314 is "NO", the method returns to operation 312 where the lookup manager continues to monitor the at least one backup target (e.g., at least until a backup period indicated in the backup schedule expires).

Alternatively, in the event that the determination in operation 314 is "YES", the method proceeds to operation 316 where, as discussed above in reference to FIGS. 2A-2B, updated backup target information indicating an updated location of the at least one backup target is provided by the lookup manager to the backup manager.

At operation 318, as discussed above in reference to FIGS. 2A-2B, the backup manager updates the backup policy (e.g., the backup policy generated in operation 310 of FIG. 3A) using the updated backup target information to obtain an updated backup policy.

At operation 320, as discussed above in reference to FIGS. 2A-2B, the backup manager performs subsequent backups (as specified in the backup schedule) of the at least one backup target using the updated backup policy.

The method may end following operation 320.

Figure 4:
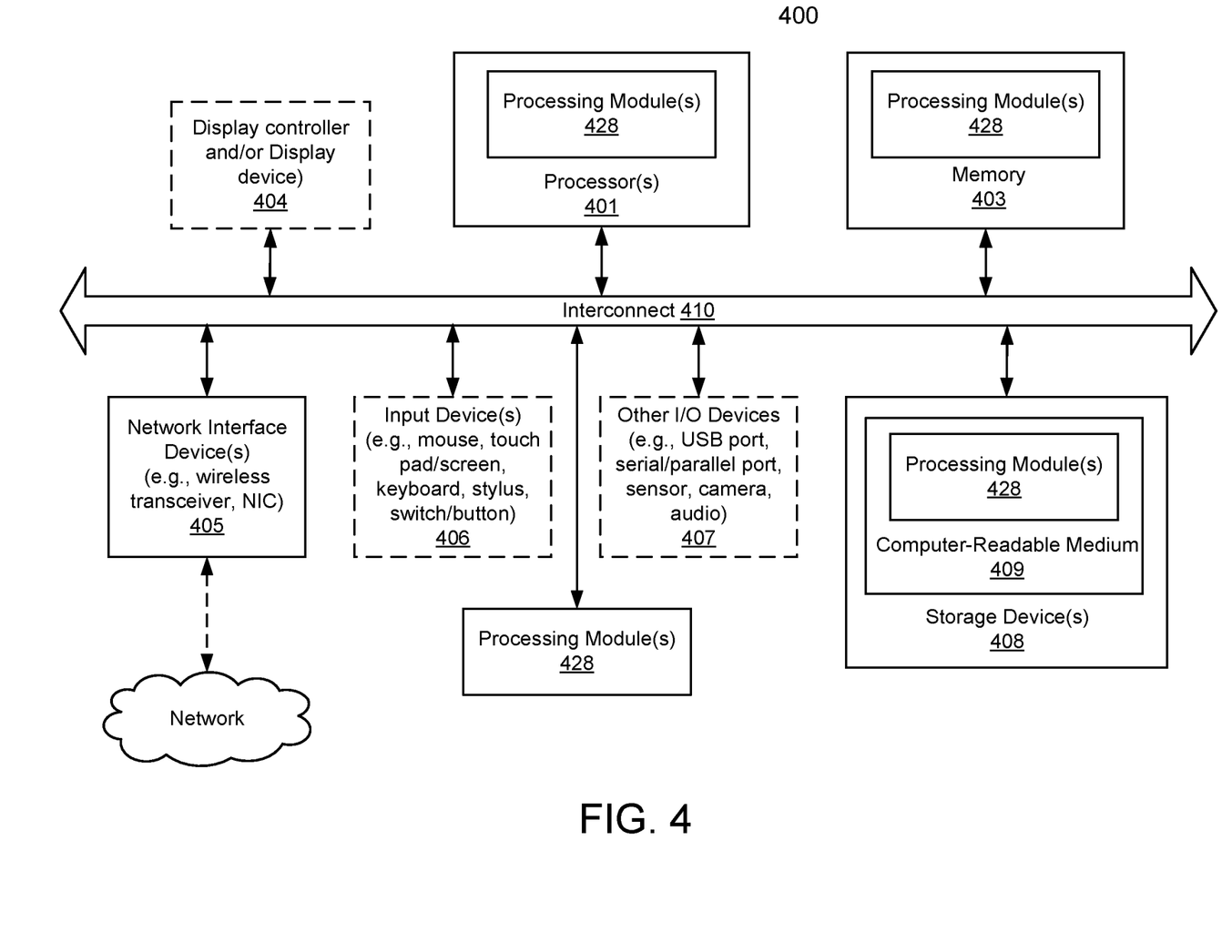
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data backup system, the method comprising:
   obtaining, by a lookup manager of the data backup system, a backup request, the backup request comprises a natural language description of at least one backup target;
   locating, by the lookup manager and within one or more edge devices of an edge infrastructure, a piece of data implicated by the natural language description as the at least one backup target;
   providing, by the lookup manager to a backup manager of the data backup system, backup target information of the at least one backup target based on the locating of the piece of data, the backup target information comprising a location of the piece of data within the edge devices of the edge infrastructure;
   generating, by the backup manager, a backup policy based, at least in part, on the backup target information; and
   performing, by the backup manager and based on the backup policy, a backing up of the at least one backup target from the edge infrastructure to a target backup location.

2. The method of claim 1, wherein the natural language description excludes information specifying the location of the at least one backup target within the edge infrastructure, and wherein the backup request specifies the target backup location.

3. The method of claim 2, wherein the location of the piece of data is unknown to a user at a point in which at which the backup request is obtained by the lookup manager and from a client device of the user, and the lookup manager provides the location of the piece of data to the backup manager without also providing the location of the piece of data to the user.

4. The method of claim 3, wherein the backup request indicates a backup schedule for the at least one backup target and a retention policy of the at least one backup target, the backup schedule and the retention policy are provided to the backup manager by the lookup manager, and the backup policy is further generated based on the backup schedule and the retention policy.

5. The method of claim 3, wherein access to the at least one backup target is restricted by privilege, and the user lacks privilege to access the at least one backup target.

6. The method of claim 1, wherein
the backup request indicates a backup schedule for the at least one backup target and a retention policy of the at least one backup target, and
the method further comprises:
monitoring, by the lookup manager and within the backup schedule, the piece of data within the edge infrastructure;
making a first determination, by the lookup manager and during the monitoring, that the piece of data is moved from a first edge device of the edge devices to a second edge device of the edge devices;
in response to the first determination, providing, by the lookup manager, updated backup target information to the backup manager, the updated backup target information including an updated location of the piece of data; and
updating, by the backup manager, the backup policy with the updated location of the piece of data to obtain an updated backup policy.

7. The method of claim 6, further comprising:
making a second determination, by the backup manager and based on the backup schedule, that a subsequent backup of the piece of data is due, the subsequent backup occurring after the piece of data is moved from the first edge device to the second edge device; and
performing, by the backup manager and in response to the second determination, the subsequent backup of the piece of data using the updated backup policy that specifies the updated location of the piece of data.

8. The method of claim 7, wherein the lookup manager monitors the piece of data at a predetermined interval until a backup period indicated in the backup schedule expires.

9. The method of claim 1, wherein the natural language description defines information content of the at least one backup target, and the information content is used as key to perform a lookup in a data structure that associates different information content with different backup targets.

10. The method of claim 1, wherein the natural language description defines software components that use data from the at least one backup target in operation of the software components, and the software components are used as keys to perform a lookup in a data structure that associates different software components with different backup targets.

11. The method of claim 1, wherein the natural language description does not exactly match any identifier ascribed to:
the at least one backup target, and
any demarcation of storage resources in which the at least one backup target is stored.

12. A non-transitory machine-readable medium having instructions stored therein, which when executed by at least one processor, cause a system to perform operations for managing a data backup system, the operations comprising:
obtaining, by a lookup manager of the data backup system, a backup request, the backup request comprises a natural language description of at least one backup target;
locating, by the lookup manager and within one or more edge devices of an edge infrastructure, a piece of data implicated by the natural language description as the at least one backup target;
providing, by the lookup manager to a backup manager of the data backup system, backup target information of the at least one backup target based on the locating of the piece of data, the backup target information comprising a location of the piece of data within the edge devices of the edge infrastructure;
generating, by the backup manager, a backup policy based, at least in part, on the backup target information; and
performing, by the backup manager and based on the backup policy, a backing up of the at least one backup target from the edge infrastructure to a target backup location.

13. The non-transitory machine-readable medium of claim 12, wherein the natural language description excludes information specifying the location of the at least one backup target within the edge infrastructure, and wherein the backup request specifies the target backup location.

14. The non-transitory machine-readable medium of claim 13, wherein the location of the piece of data is unknown to a user at a point in which at which the backup request is obtained by the lookup manager and from a client device of the user, and the lookup manager provides the location of the piece of data to the backup manager without also providing the location of the piece of data to the user.

15. The non-transitory machine-readable medium of claim 14, wherein the backup request indicates a backup schedule for the at least one backup target and a retention policy of the at least one backup target, the backup schedule and the retention policy are provided to the backup manager by the lookup manager, and the backup policy is further generated based on the backup schedule and the retention policy.

16. The non-transitory machine-readable medium of claim 12, wherein the natural language description does not exactly match any identifier ascribed to:
the at least one backup target, and
any demarcation of storage resources in which the at least one backup target is stored.

17. A system comprising:
at least one processor; and
a memory coupled to the processor that stores instructions, which when executed by the processor, cause the system to perform operations for managing a data backup system, the operations comprising:
obtaining, by a lookup manager of the data backup system, a backup request, the backup request comprises a natural language description of at least one backup target;
locating, by the lookup manager and within one or more edge devices of an edge infrastructure, a piece of data implicated by the natural language description as the at least one backup target;
providing, by the lookup manager to a backup manager of the data backup system, backup target information of the at least one backup target based on the locating of the piece of data, the backup target information comprising a location of the piece of data within the edge devices of the edge infrastructure;
generating, by the backup manager, a backup policy based, at least in part, on the backup target information; and
performing, by the backup manager and based on the backup policy, a backing up of the at least one backup target from the edge infrastructure to a target backup location.

18. The system of claim 17, wherein the natural language description excludes information specifying the location of the at least one backup target within the edge infrastructure, and wherein the backup request specifies the target backup location.

19. The system of claim 18, wherein the location of the piece of data is unknown to a user at a point in which at which the backup request is obtained by the lookup manager and from a client device of the user, and the lookup manager provides the location of the piece of data to the backup manager without also providing the location of the piece of data to the user.

20. The system of claim 17, wherein the natural language description does not exactly match any identifier ascribed to:
- the at least one backup target, and
- any demarcation of storage resources in which the at least one backup target is stored.

* * * * *